Oct. 25, 1955  P. D. STECKMAN  2,721,680
FISHING ROD HOLDERS
Filed July 14, 1953

INVENTOR
PANNIER D. STECKMAN
BY
ATTORNEY

United States Patent Office 2,721,680
Patented Oct. 25, 1955

2,721,680

FISHING ROD HOLDERS

Pannier D. Steckman, Irvington, N. J.

Application July 14, 1953, Serial No. 367,809

6 Claims. (Cl. 224—29)

The present invention relates to a support for fishing rods and the like during transportation within an auto vehicle.

The transportation of fishing poles when travelling by automobile has heretofore presented difficulties and in many cases the poles are attached to the outside of the car body, as for example on the car top or from fender to fender. This method of transportation has certain disadvantages in that it subjects the poles to accidental impacts with possible injury.

It is preferable to support the poles inside the car but owing to their length they would ordinarily be in the way of the occupants of the car. In accordance with the present invention one or more poles may be so supported and held that the occupants of the car would be subject to no inconvenience nor would the poles be in danger of accidental injury.

The present supporting device is for the purpose of holding relatively long fishing rods such for example as a surf casting rod the major portion of which is of a fixed length after the handle or butt has been removed. The device also serves to support other types of rods in cases where it is desired to transport the rod and reel with the separable parts assembled. This is an advantage in cases where the user wishes to move from one fishing ground to another without having to disassemble the rod.

It is an object of the invention, therefore to provide a fishing rod support for holding one or more fishing rods within an auto vehicle.

Another object of the invention is to provide a fishing rod support that may be quickly and conveniently positioned within or removed from an auto vehicle.

Another object of the invention is to provide a fishing rod support for holding a plurality of rods within an auto vehicle in position for individual removal or replacement.

Other objects and advantages of the invention will be more clearly understood by reference to the following description together with the accompanying drawing in which.

Figure 1:
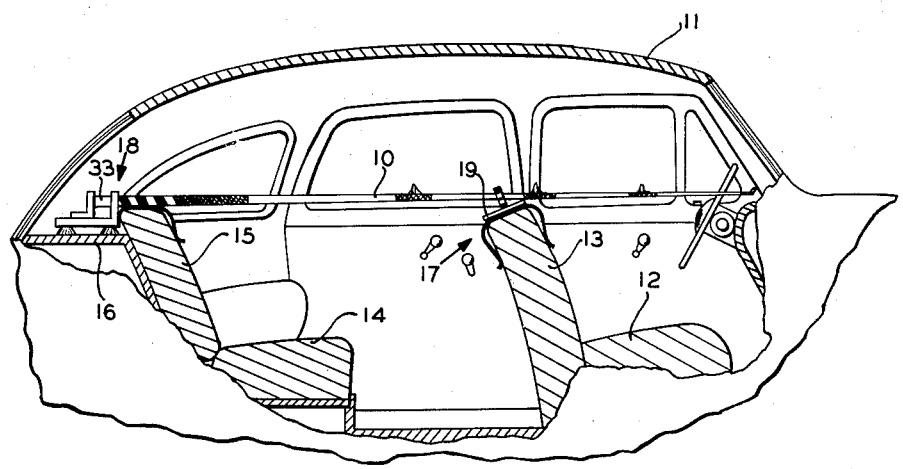
Fig. 1 is a side view of an auto vehicle partly broken away to show the present invention as actually used.
Figure 1:
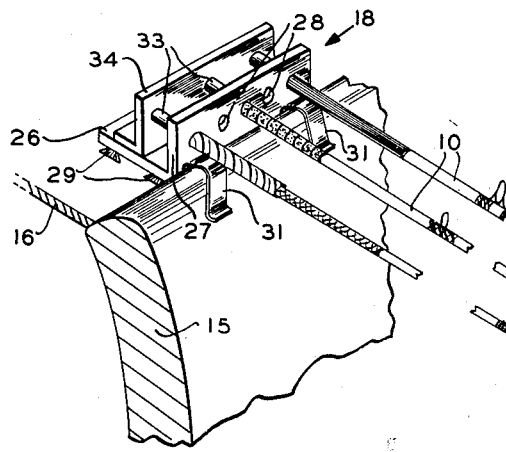
Figure 2:
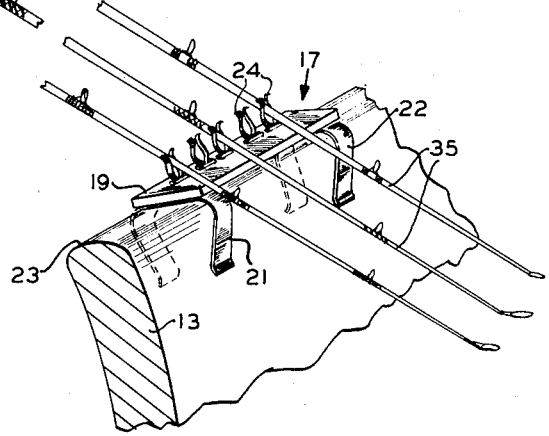
Fig. 2 is an enlarged perspective view of the present fishing rod holder supporting a plurality of rods above the car seats.
Figure 3:
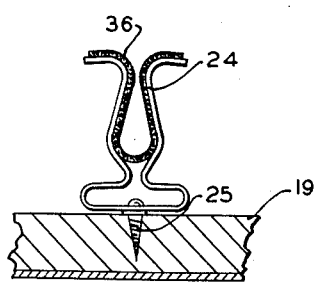
Fig. 3 is an elevational view of one of the clips employed to engage a rod tip and Fig. 4 is a view similar to Fig. 3 but shows a clip having a suction cup.

As shown in the drawing the present invention may be employed to hold fishing rods 10 in an auto vehicle 11 having forward seat 12 with back rest 13 and rear seat 14 with back rest 15. Adjacent to back rest 15 and extending rearward is a shelf 16 as found in the standard auto structure.

In accordance with the invention the upper edges of the back rests of the seats are utilized as well as the rear car shelf and a rod holder is provided comprising two bracket members 17 and 18.

Bracket 17 which may be termed the forward bracket includes a base plate 19 which may be of wood or other suitable material provided with resilient metallic strips, or arms 21 and 22 for engaging the top edge 23 of forward seat back rest 13 to hold plate 19 in a fixed position. The plate 19 is provided with spring clips 24 having the usual wood screw 25 for securing the clips to plate 19 in spaced aligned relation.

Bracket 18 which may be termed the rear bracket includes a base plate 26 and side plate 27 along one edge thereof and disposed perpendicular to the surface of plate 26. The plate 27 is provided with a plurality of apertures 28 in spaced aligned relation.

The base plate 26 is provided with resilient pads or feet 29 to engage rear shelf 16 of the car.

When the bracket 18 is positioned on shelf 16 the feet 29 which may be of rubber or other suitable material, hold the bracket in position in close relation to the seat back 15. The bracket is also provided with retainer arms 31 which engage the seat back. These arms 31 may or may not be used since in practice it has been found that the feet 29 hold the bracket 18 sufficiently against displacement. On the other hand the plate 27 may if desired be provided with metallic strips or arms as employed for bracket 17.

As shown poles 10 are of the surf casting type and the hand pieces have been removed. The butt ends 33 of the poles are inserted in the apertures 28 and extend through side plate 27. If desired a stop member 34 may be provided but usually the ends 33 taper and may be inserted in the apertures until the walls of the apertures are engaged. The other or tip ends 35 of the rods are positioned in clips 24 at points adjacent to the rod tips.

Thus a number of poles may be held within the car longitudinally thereof and across the seat backs. The space required for say, four or five rods, is relatively small and a passenger may be seated on each side of the rods without inconvenience to their comfort.

The clips 24 which engage the rods at their thin or tip ends are of spring metal and may as shown be provided with layer 36 of suitable soft material to cushion the contact between the clip arms and the rod.

Figure 4:
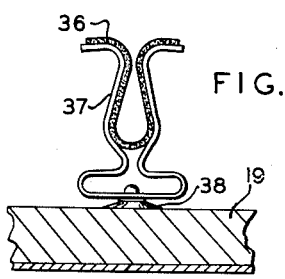

As above stated the forward bracket 17 includes a plate 19 to which are secured the clips 24 which are fixed to the plate. It is desirable however to provide the bracket 17 with removable clips which may be applied individually to hold one or more rods. For this purpose a clip 37 as shown in Fig. 4 may be provided with a suction cup 38. The plate 19 may be of smooth or polished material such for example as a plastic to provide a surface to which the suction cups will adhere or be readily removed.

As will be evident the present invention provides a practical and convenient support within an auto vehicle for the transportation of relatively long rods.

Although a preferred embodiment of the invention is shown and described herein it will be understood that modifications may be made therein without departing from the spirit and scope of the invention as set forth in the appended claims.

What is claimed is:

1. A fishing rod support for auto vehicles, comprising a forward and a rear bracket member, means for attaching said forward bracket to the back of a forward car seat, members on said rear bracket for frictionally engaging the shelf adjacent to the rear car seat, said rear bracket having a side plate, said side plate having an aperture to receive the butt end of a fishing rod to support said end above said rear seat, said forward bracket having a clip member for gripping said rod adjacent to the tip end thereof to support said end above said forward car seat.

2. A fishing rod support for auto vehicles, comprising a forward and a rear bracket member, means for attaching said forward bracket to the back of a forward car seat, members on said rear bracket for engaging the back of a rear car seat, said rear bracket having a vertical plate member, said plate member having an aperture to receive the butt end of a fishing rod to support said end above said rear seat, said forward bracket having a horizontal plate member, a clip member mounted on said horizontal plate member for gripping said rod adjacent to the tip end thereof to support said end above said forward seat, said clip member having a suction cup for removably attaching said clip to said horizontal plate member.

3. A fishing rod support for auto vehicles, comprising a forward and a rear bracket member, spring arms for attaching said forward bracket to the back of a forward car seat, contact members on said rear bracket for engaging the rear car shelf, said rear bracket having a plate member, said plate member having a plurality of apertures to receive the butt ends of fishing rods to support said ends above said rear shelf, said forward bracket having a plurality of clip members for gripping said rods adjacent the tip ends thereof to support said ends above said forward car seat.

4. A fishing rod support for auto vehicles, comprising a forward and a rear bracket member, a pair of spring arms for attaching said forward bracket to the back of a forward car seat, retainer arms on said rear bracket for engaging the back of a rear car seat, said rear bracket having a base plate, a side plate on said base plate, said side plate having apertures to receive the butt ends of fishing rods to support said ends above said rear seat back, said forward bracket having a horizontal plate member, clip members for gripping said rods adjacent to the tip ends thereof to support said ends above said forward seat, each of said clip members having means for removably attaching said clip to said horizontal plate member.

5. A fishing rod support for auto vehicles, comprising a forward and a rear bracket member, means for attaching said forward bracket to the back of a forward car seat, contact members on said rear bracket for engaging the back of a rear car seat, said rear bracket having a plate member, said plate member having a plurality of apertures to receive the butt ends of fishing rods to support said ends above said rear seat back, said forward bracket having a horizontal plate member, clip members for gripping said rod adjacent to the tip ends thereof to support said ends above said forward seat, each of said clip members having a suction cup for removably attaching said clip to said horizontal plate member.

6. A fishing rod support for auto vehicles, comprising a forward and a rear bracket member, means for attaching said forward bracket to the back of a forward car seat, means for holding said rear bracket in fixed position above and adjacent to the rear car seat, said rear bracket having means for holding the butt end of a fishing rod to support said end above said rear car seat, said forward bracket having means for supporting said rod adjacent to the tip end thereof above said forward car seat.

References Cited in the file of this patent

UNITED STATES PATENTS

| | | |
|---|---|---|
| 2,171,053 | White et al. | Aug. 29, 1939 |
| 2,173,953 | Schwisow | Sept. 26, 1939 |
| 2,573,275 | Richey | Oct. 30, 1951 |
| 2,578,067 | Jensen | Dec. 11, 1951 |
| 2,640,634 | Francis | June 2, 1953 |